United States Patent
Morita et al.

(10) Patent No.: US 9,217,904 B2
(45) Date of Patent: Dec. 22, 2015

(54) LIQUID CRYSTAL DISPLAY DEVICE WITH A LATERAL ELECTRIC FIELD

(71) Applicant: Japan Display Inc., Minato-ku (JP)

(72) Inventors: Yusuke Morita, Fukaya (JP); Jin Hirosawa, Saitama (JP); Hirokazu Morimoto, Fukaya (JP); Masakatsu Kitani, Fukaya (JP)

(73) Assignee: Japan Display Inc., Minato-ku (JP)

( * ) Notice: Subject to any disclaimer, the term of this patent is extended or adjusted under 35 U.S.C. 154(b) by 235 days.

(21) Appl. No.: 13/905,657

(22) Filed: May 30, 2013

(65) Prior Publication Data

US 2013/0321727 A1 Dec. 5, 2013

(30) Foreign Application Priority Data

May 31, 2012 (JP) ................................ 2012-124587

(51) Int. Cl.
*G02F 1/1343* (2006.01)
*G02F 1/1362* (2006.01)

(52) U.S. Cl.
CPC .... *G02F 1/136286* (2013.01); *G02F 1/134363* (2013.01); *G02F 1/136213* (2013.01); *G02F 1/136227* (2013.01); *G02F 2001/13629* (2013.01); *G02F 2001/134318* (2013.01); *G02F 2001/134381* (2013.01); *G02F 2001/136218* (2013.01); *G02F 2201/122* (2013.01); *G02F 2201/123* (2013.01); *G02F 2201/128* (2013.01)

(58) Field of Classification Search
CPC ................. G02F 1/136213; G02F 1/136227; G02F 1/136286; G02F 2001/13629; G02F 2201/122
USPC ............................ 349/39, 139, 140, 142, 143
See application file for complete search history.

(56) References Cited

U.S. PATENT DOCUMENTS

| | | | |
|---|---|---|---|
| 6,266,116 B1 | 7/2001 | Ohta et al. | |
| 6,933,988 B2 * | 8/2005 | Ohgami et al. ................. | 349/39 |
| 7,130,010 B2 * | 10/2006 | Jeoung .............. | G02F 1/134363 349/140 |
| 7,652,727 B2 * | 1/2010 | Lee ................... | G02F 1/136213 349/39 |
| 2001/0010575 A1 | 8/2001 | Yoshida et al. | |
| 2004/0165136 A1 | 8/2004 | Sugiyama et al. | |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/897,757, filed May 20, 2013, Hirosawa.

(Continued)

*Primary Examiner* — Paisley L Arendt
(74) *Attorney, Agent, or Firm* — Oblon, McClelland, Maier & Neustadt, L.L.P.

(57) ABSTRACT

According to one embodiment, a liquid crystal display device includes, a first substrate including a switching element which is electrically connected to a gate line and a source line and includes a drain electrode opposed to a storage capacitance line, a pixel electrode which includes a main pixel electrode extending in a second direction and a sub-pixel electrode which extends in a first direction at a position inside a position above an edge of the drain electrode and is put in contact with the drain electrode, a second substrate including a common electrode, and a liquid crystal layer.

14 Claims, 6 Drawing Sheets

(56) References Cited

U.S. PATENT DOCUMENTS

| | | |
|---|---|---|
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2011/0234947 A1* | 9/2011 | Hirosawa .................. 349/96 |
| 2012/0268703 A1* | 10/2012 | Funakoshi et al. ............ 349/139 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 9-230380 A | 9/1997 |
| JP | 10-26765 | 1/1998 |
| JP | 10-90708 | 4/1998 |
| JP | 11-295764 A | 10/1999 |
| JP | 2000-89240 A | 3/2000 |
| JP | 2004-12730 A | 1/2004 |
| JP | 2004-165598 A | 6/2004 |
| JP | 2004-192015 A | 7/2004 |
| JP | 2005-3802 | 1/2005 |
| JP | 3644653 | 2/2005 |
| JP | 2005-242307 | 9/2005 |
| JP | 2009-109656 A | 5/2009 |
| JP | 2009-192883 A | 8/2009 |
| JP | 2011-209454 | 10/2011 |

OTHER PUBLICATIONS

U.S. Appl. No. 13/910,363, filed Jun. 5, 2013, Hirosawa.
U.S. Appl. No. 14/063,502, filed Oct. 25, 2013, Hirosawa.
Office Action issued Sep. 29, 2015 in Japanese Patent Application No. 2012-124587 (with English language translation).

\* cited by examiner

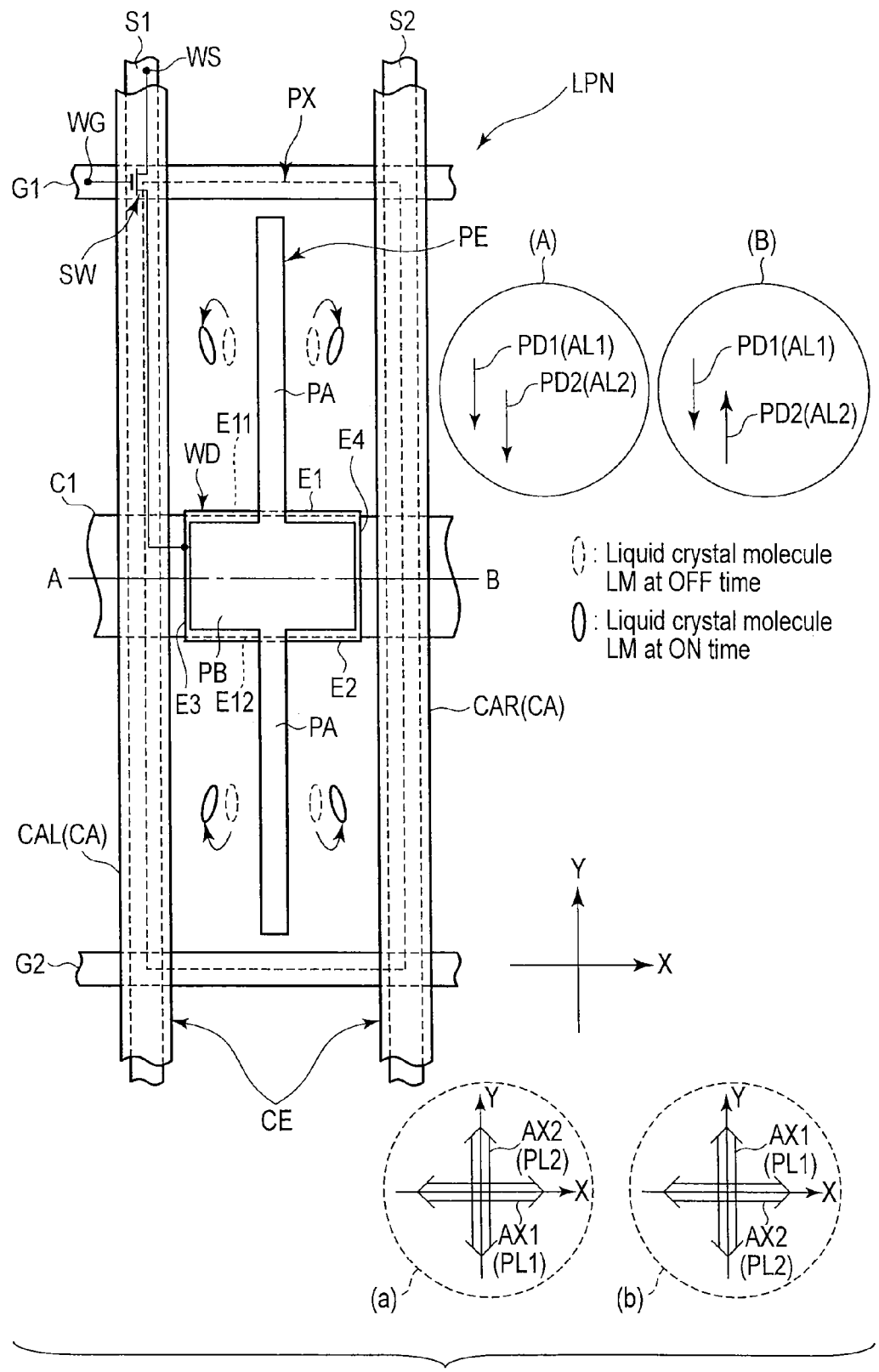
F I G. 2

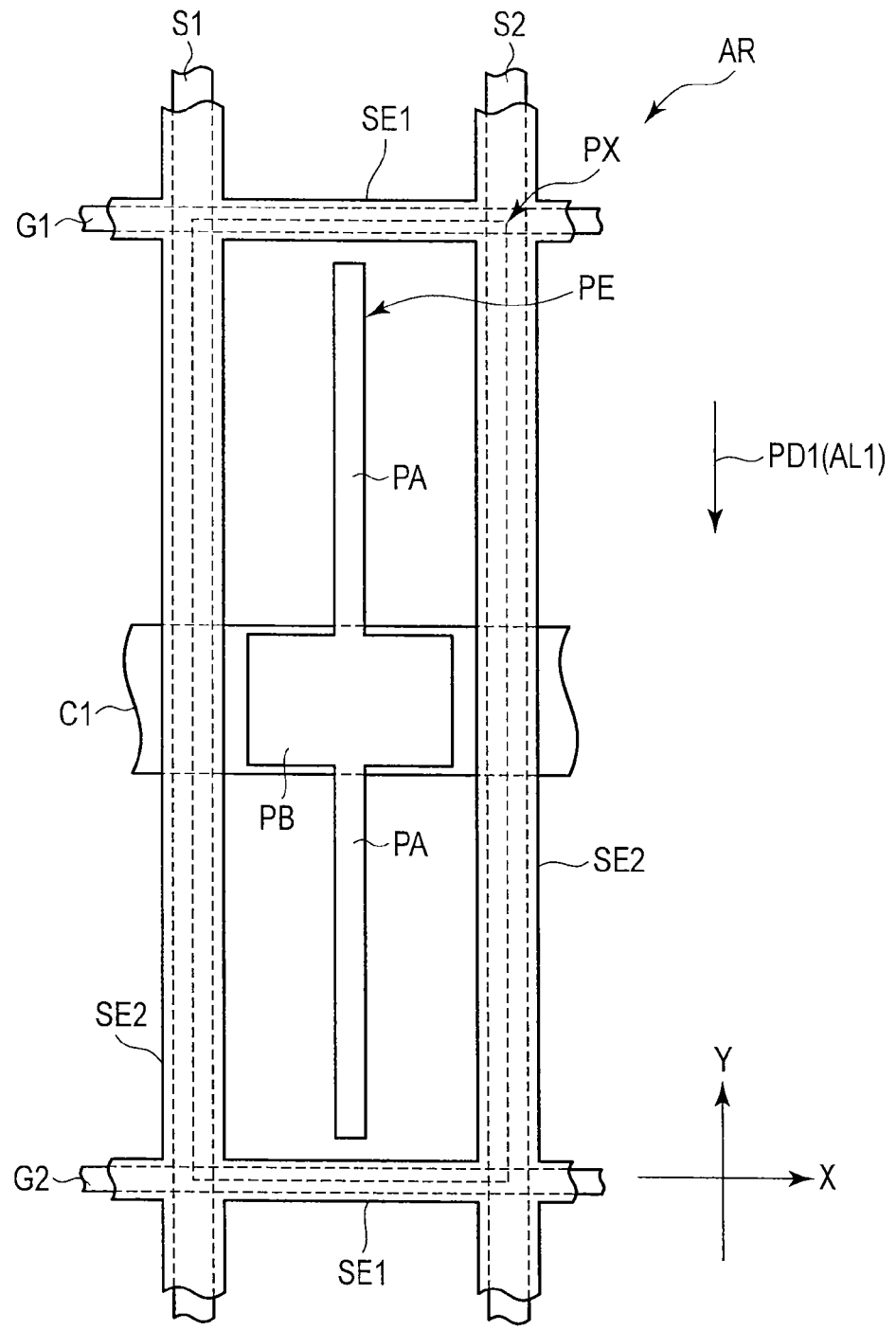
F I G. 6

LIQUID CRYSTAL DISPLAY DEVICE WITH A LATERAL ELECTRIC FIELD

CROSS-REFERENCE TO RELATED APPLICATIONS

This application is based upon and claims the benefit of priority from Japanese Patent Application No. 2012-124587, filed May 31, 2012, the entire contents of which are incorporated herein by reference.

FIELD

Embodiments described herein relate generally to a liquid crystal display device.

BACKGROUND

In recent years, in active matrix liquid crystal devices in which switching elements are incorporated in respective pixels, configurations, which make use of a lateral electric field (including a fringe electric field), such as an IPS (In-Plane Switching) mode or an FFS (Fringe Field Switching) mode, have been put to practical use. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate. In connection with the lateral electric field mode, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a structure example of one pixel at a time when a liquid crystal display panel shown in FIG. 1 is viewed from a counter-substrate side.

FIG. 6 is a plan view which schematically shows another structure example of the array substrate, which is applicable to the embodiment.

DETAILED DESCRIPTION

Figure 1:
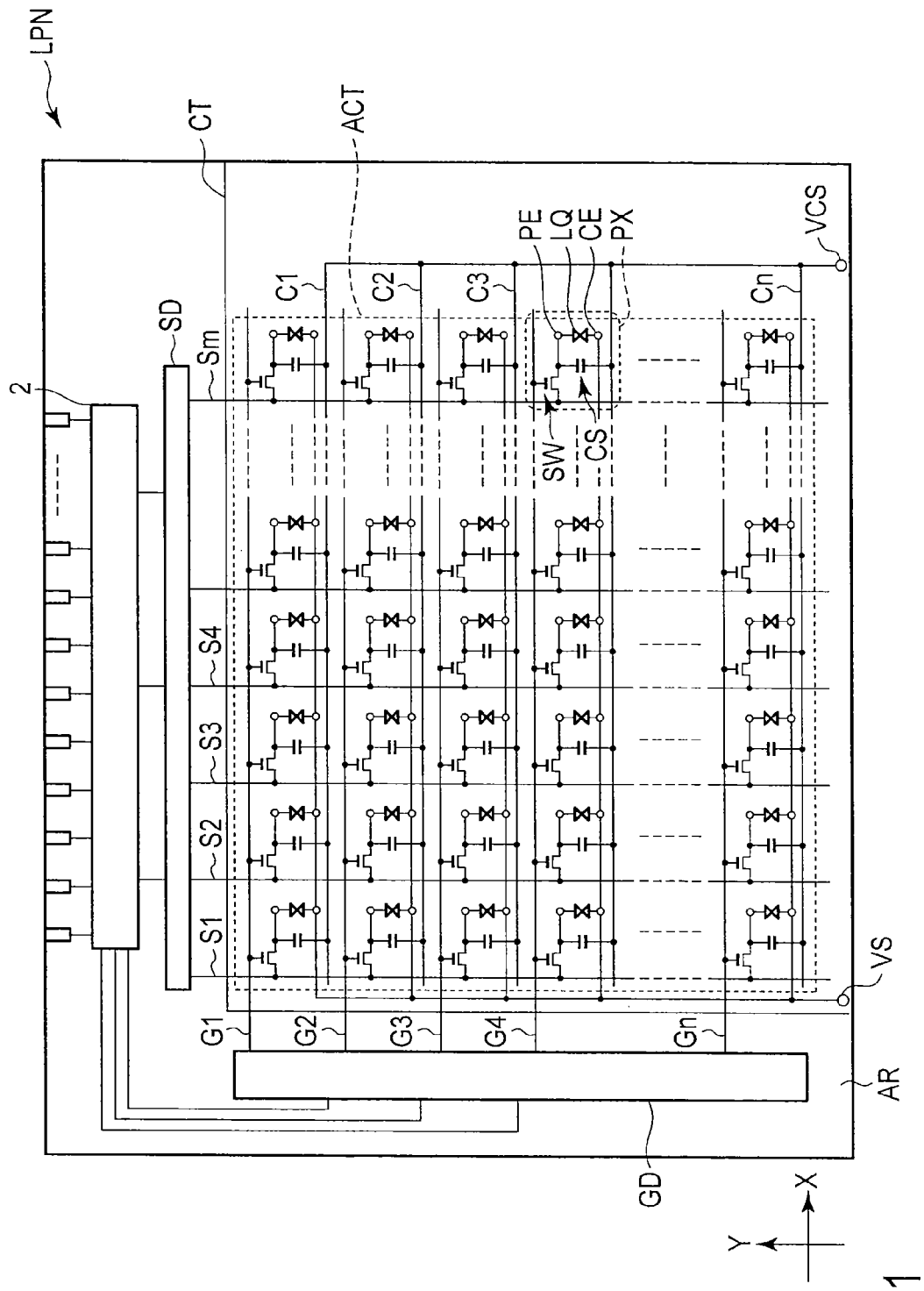
FIG. 1 is a view which schematically illustrates a structure and an equivalent circuit of a liquid crystal display device according to an embodiment.

In general, according to one embodiment, a liquid crystal display device includes: a first substrate including a gate line extending in a first direction, a storage capacitance line spaced apart from the gate line, a first interlayer insulation film covering the gate line and the storage capacitance line, a source line located on the first interlayer insulation film and extending in a second direction crossing the first direction, a switching element which is electrically connected to the gate line and the source line and includes a drain electrode located on the first interlayer insulation film, spaced apart from the source line and opposed to the storage capacitance line, a second interlayer insulation film covering the source line and the drain electrode, a pixel electrode which is located on the second interlayer insulation film and includes a main pixel electrode extending in the second direction and a sub-pixel electrode which extends in the first direction at a position inside a position above an edge of the drain electrode and is put in contact with the drain electrode, and a first alignment film covering the pixel electrode; a second substrate including a common electrode, which includes a main common electrode extending in the second direction on both sides of the main pixel electrode, and a second alignment film covering the common electrode; and a liquid crystal layer held between the first substrate and the second substrate.

According to another embodiment, a liquid crystal display device includes: a first substrate including a gate line extending in a first direction, a storage capacitance line spaced apart from the gate line, a first interlayer insulation film covering the gate line and the storage capacitance line, a source line located on the first interlayer insulation film and extending in a second direction crossing the first direction, a switching element electrically connected to the gate line and the source line, a second interlayer insulation film covering the source line, an auxiliary electrode which is located on the second interlayer insulation film, is opposed to the storage capacitance line and is electrically connected to the switching element, a third interlayer insulation film covering the auxiliary electrode, a pixel electrode which is located on the third interlayer insulation film and includes a main pixel electrode extending in the second direction and a sub-pixel electrode which extends in the first direction at a position inside a position above an edge of the auxiliary electrode and is put in contact with the auxiliary electrode, and a first alignment film covering the pixel electrode; a second substrate including a common electrode, which includes a main common electrode extending in the second direction on both sides of the main pixel electrode, and a second alignment film covering the common electrode; and a liquid crystal layer held between the first substrate and the second substrate.

According to another embodiment, a liquid crystal display device includes: a first substrate including a storage capacitance line extending in a first direction, a first interlayer insulation film covering the storage capacitance line, a switching element including a drain electrode located on the first interlayer insulation film and opposed to the storage capacitance line, a second interlayer insulation film covering the drain electrode, a pixel electrode which is located on the second interlayer insulation film and includes a main pixel electrode extending in a second direction and a sub-pixel electrode which extends in the first direction at a position inside a position above an edge of the drain electrode and is put in contact with the drain electrode, and a first alignment film covering the pixel electrode; a second substrate including a common electrode, which includes a main common electrode extending in the second direction, and a second alignment film covering the common electrode; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

The liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, gate lines G (G1 to Gn), storage capacitance lines C (C1 to Cn), and source lines S (S1 to Sm). The gate lines G extend, for example, substantially linearly in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S extend substantially linearly in the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR. The gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane (or a substrate major surface) which is defined by the first direction X and second direction Y (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE may be formed of, for example, a transparent, electrically conductive material such as indium tin oxide (ITO) or indium zinc oxide (IZO), or may be formed of an opaque wiring material such as aluminum (Al), titanium (Ti), silver (Ag), molybdenum (Mo), tungsten (W), copper (Cu) or chromium (Cr).

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

A gate line G1, a gate line G2 and a storage capacitance line C1 extend in the first direction. A source line S1 and a source line S2 extend in the second direction. The storage capacitance line C1 is located at a substantially middle point between the gate line G1 and gate line G2. Specifically, the distance between the gate line G1 and storage capacitance line C1 in the second direction Y is substantially equal to the distance between the gate line G2 and storage capacitance line C1 in the second direction Y.

In the example illustrated, as indicated by a broken line, the pixel PX corresponds to a grid-shaped area defined by the gate line G1, gate line G2, source line S1 and source line S2, and has a rectangular shape having a greater length in the second direction Y than in the first direction X. The length of the pixel PX in the first direction X corresponds to the pitch between the source line S1 and source line S2 in the first direction X. The length of the pixel PX in the second direction Y corresponds to the pitch between the gate line G1 and gate line G2 in the second direction Y. The pixel electrode PE is disposed between the neighboring source line S1 and source line S2. In addition, the pixel electrode PE is disposed between the gate line G1 and gate line G2.

In the pixel PX illustrated, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX.

The switching element SW, in the illustrated example, is electrically connected to the gate line G1 and source line S1. The switching element SW is provided at an intersection between the gate line G1 and source line S1, and includes a semiconductor layer (not shown). The semiconductor layer is formed of, for example, polysilicon, is located below the source line S1, crosses the gate line G1, and extends under the storage capacitance line C1. A source electrode WS of the switching element SW corresponds to that region of the source line S1, which is in contact with the semiconductor layer. A gate electrode WG of the switching element SW corresponds to that region of the gate line G1, which crosses the semiconductor layer. A drain electrode WD of the switching element SW is in contact with the semiconductor layer extending under the storage capacitance line C1. The switching element SW is provided in a region where the source line S1 and storage capacitance line C1 overlap, and hardly protrudes from the region where the source line S1 and storage capacitance line C1 overlap, thereby suppressing a decrease in area of an aperture portion which contributes to display.

In the present embodiment, the drain electrode WD is located between the source line S1 and source line S2, but is spaced apart from the source line S1 and source line S2. In addition, the drain electrode WD is opposed to the storage capacitance line C1. In the example illustrated, the drain electrode WD has a rectangular island shape, and includes edges E1 and E2 along the first direction X and edges E3 and E4 along the second direction Y. The edge E1 substantially overlaps an edge E11 of the storage capacitance line C1 in the first direction X, and the edge E2 substantially overlaps an edge E12 of the storage capacitance line C1 in the first direction X. The edge E3 is opposed to the source line S1, with a gap being formed between the edge E3 and source line S1. The edge E4 is opposed to the source line S2, with a gap being formed between the edge E4 and source line S2. Thus, the drain electrode WD is disposed in a manner to overlap the storage capacitance line C1 in the X-Y plane, except for the gap between the edge E3 and the source line S1 and the gap between the edge E4 and the source line S2. Incidentally, each of the edges E1 and E2 may be located outside the edges E11 and E12 of the storage capacitance line C1. In the drain electrode WD, the width between the edge E1 and edge E2 in the second direction Y is equal to or greater than the width of the storage capacitance line C1 in the second direction Y. Specifically, in the case where the edge E1 and edge E2 overlap the edge E11 and E12, respectively, the width of the drain electrode WD is equal to the width of the storage capacitance line C1. In addition, in the case where the edge E1 and edge E2 are located outside the edge E11 and E12, respectively, the width of the drain electrode WD is greater than the width of the storage capacitance line C1. The width between the edge E3 and edge E4 in the first direction X is less than the width between the source line S1 and source line S2 in the first direction X.

The pixel electrode PE includes a main pixel electrode PA and a sub-pixel electrode PB. The main pixel electrode PA and sub-pixel electrode PB are formed integral or continuous, and are electrically connected to each other. In the meantime, in the example illustrated, only the pixel electrode PE disposed in one pixel PX is illustrated, but pixel electrodes of the same shape are also disposed in other pixels, the depiction of which is omitted. The main pixel electrode PA is located between the source line S1 and source line S2, and linearly extends in the second direction Y to the vicinity of the upper side end portion of the pixel PX and to the vicinity of the lower side end portion of the pixel PX. In the example illustrated, one main pixel electrode PA is located at a substantially middle point between the source line S1 and source line S2. The distance in the first direction X between the source line S1 and main pixel electrode PA is substantially equal to the distance in the first direction X between the source line S2 and main pixel electrode PA. The main pixel electrode PA is formed in a strip shape having a substantially uniform width in the first direction X. Incidentally, the pixel electrode PE may include a plurality of main pixel electrodes PA.

The sub-pixel electrode PB is formed in a strip shape extending in the first direction X. In the example illustrated, the sub-pixel electrode PB crosses a substantially middle portion in the second direction Y of the main pixel electrode PA. Specifically, the pixel electrode PE shown in this example is formed in a cross shape. In addition, in the example illustrated, the sub-pixel electrode PB is located at a position above the storage capacitance line C1 or at a position opposed to the drain electrode WD. The sub-pixel electrode PB is disposed in a manner to overlap the drain electrode WD in the X-Y plane. More preferably, the entirety of the sub-pixel electrode PB is located inside positions above the edges E1, E2, E3 and E4 of the drain electrode WD. The sub-pixel electrode PB is put in contact with the drain electrode WD.

The common electrode CE includes a main common electrode CA. The main common electrode CA, in the X-Y plane, is located on both sides of the main pixel electrode PA, and linearly extends in the second direction Y in parallel to the main pixel electrode PA. The main common electrode CA is formed in a strip shape having a substantially uniform width in the first direction X. In the example illustrated, the main common electrode CA includes two main common electrodes arranged in parallel with a distance in the first direction X, namely a main common electrode CAL disposed at the left side end portion of the pixel PX, and a main common electrode CAR disposed at the right side end portion of the pixel PX. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAL is opposed to the source line S1, and the main common electrode CAR is opposed to the source line S2. The main common electrode CAL and the main common electrode CAR are electrically connected to each other within the active area or outside the active area.

Paying attention to the positional relationship between the pixel electrode PE and the common electrode CE, the following can be said. In the X-Y plane, the main pixel electrode PA and main common electrode CA are substantially parallel, and are alternately arranged in the first direction X. Specifically, one main pixel electrode PA is located between the main common electrode CAL and main common electrode CAR which neighbor with a distance in the first direction X. Alternatively, there may be a case in which one main common electrode CA is located between main pixel electrodes PA which neighbor with a distance in the first direction X. The distance in the first direction X between the main pixel electrode PA and main common electrode CA is substantially uniform. For example, the distance in the first direction X between the main common electrode CAL and main pixel electrode PA is equal to the distance in the first direction X between the main common electrode CAR and main pixel electrode PA. The distance in the first direction X between the main pixel electrode PA and main common electrode CA is greater than the thickness of the liquid crystal layer LQ, and is double or more the thickness of the liquid crystal layer LQ.

Figure 3:
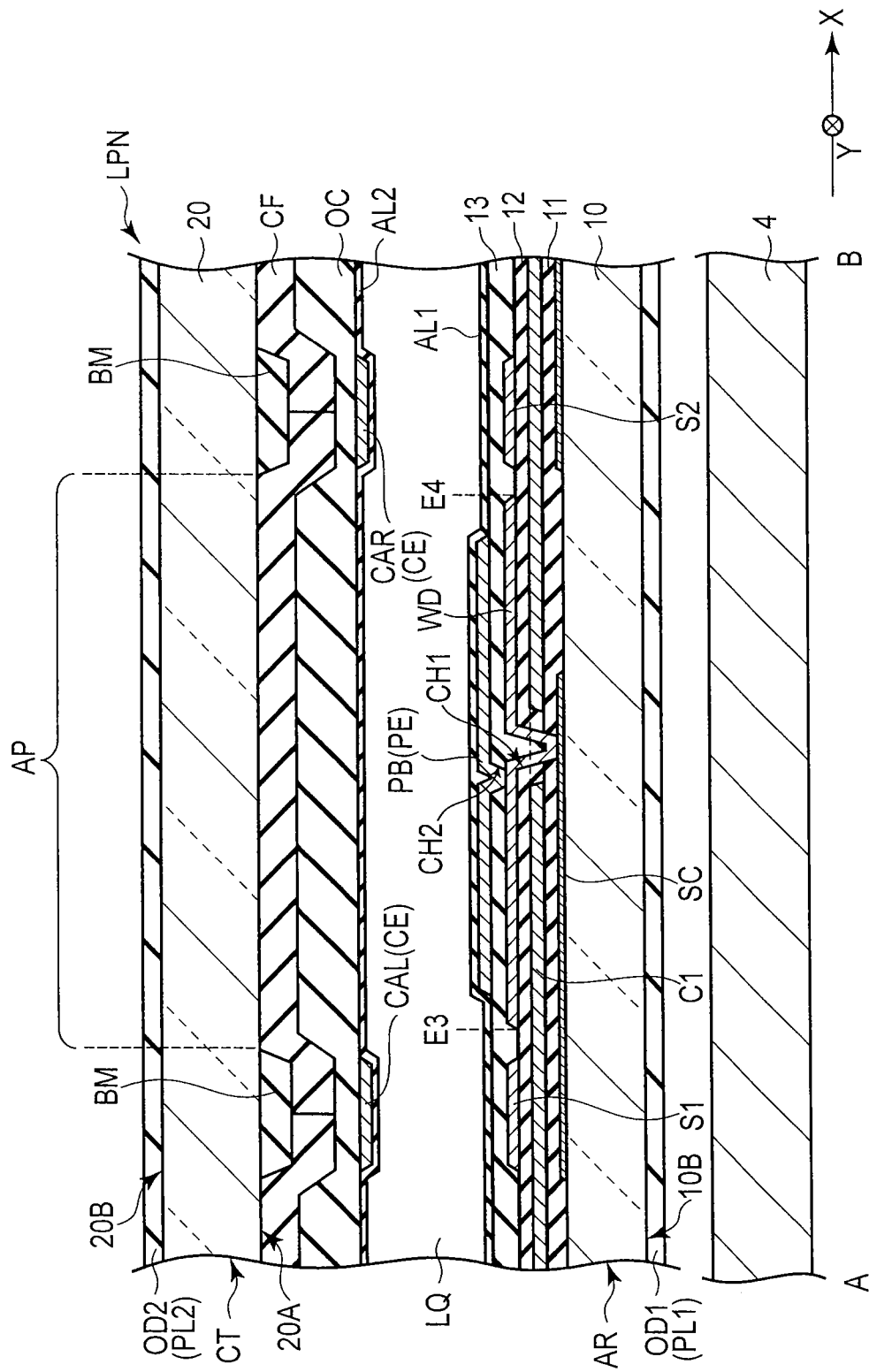
FIG. 3 is a schematic cross-sectional view, taken along line A-B in FIG. 2, showing a cross-sectional structure of the liquid crystal display panel shown in FIG. 2.

FIG. 3 is a schematic cross-sectional view, taken along line A-B in FIG. 2, showing a cross-sectional structure of the liquid crystal display panel LPN shown in FIG. 2. FIG. 3 shows only parts which are necessary for the description.

A backlight 4 is disposed on the back side of the array substrate AR which constitutes the liquid crystal display panel LPN. Various modes are applicable to the backlight 4. A description of the detailed structure of the backlight 4 is omitted.

The array substrate AR is formed by using a first insulative substrate 10 having light transmissivity. The array substrate AR includes a semiconductor layer SC, a storage capacitance line C1, a source line S1, a source line S2, a drain electrode WD, a pixel electrode PE, a first insulation film 11, a second insulation film 12, a third insulation film 13, and a first alignment film AL1.

The semiconductor layer SC is formed on the first insulative substrate 10, and is covered with the first insulation film 11. The storage capacitance line C1 and the gate line (not shown) are formed on the first insulation film 11, and are covered with the second insulation film (first interlayer insulation film) 12. The drain electrode WD, source line S1 and source line S2 are formed on the second insulation film 12 and are covered with the third insulation film (second interlayer insulation film) 13. The first insulation film 11 and second insulation film 12 are formed of, for example, a transparent inorganic material such as silicon oxide or silicon nitride. The third insulation film 13 is formed of, for example, a transparent resin material.

The drain electrode WD extends in a contact hole CH1 which penetrates the first insulation film 11 and second insulation film 12, and is put in contact with the semiconductor layer SC which is exposed from the contact hole CH1. The drain electrode WD is an electrically conductive layer which is formed in the same layer as the source line S1, etc., and can be formed batchwise together with the source line S1, etc. of the same material. A gap is created between the edge E3 of the drain electrode WD and the source line S1. A gap is created between the edge E4 of the drain electrode WD and the source line S2. The pixel electrode PE is formed on the third insulation film 13. The sub-pixel electrode PB extends in a contact hole CH2 which penetrates the third insulation film 13, and is put in contact with the drain electrode WD which is exposed from the contact hole CH2.

The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed on the third insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, a common electrode CE and a second alignment film AL2, on the inside of the second insulative substrate 20, that is, on that side of the second insulative substrate 20, which is opposed to the array substrate AR.

The black matrix BM partitions each pixel PX and forms an aperture portion AP which is opposed to the pixel electrode PE. The black matrix BM is disposed so as to be opposed to wiring portions, such as the source lines S, gate lines and switching elements. In the example illustrated, the black matrix BM includes only portions which extend in the second direction Y, but the black matrix BM may also include portions extending in the first direction X. The black matrix BM is disposed on an inner surface 20A of the second insulative substrate 20, which is opposed to the array substrate AR.

The color filter CF is disposed in association with each pixel PX. The color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. Boundaries between these color filters CF are located at positions overlapping the black matrix BM. The overcoat layer OC covers the color filters CF. The overcoat layer OC reduces the effect of asperities on the surface of the color filters CF. The overcoat layer OC is formed of, for example, a transparent resin material.

The common electrode CE is formed on that side of the overcoat layer OC, which is opposed to the array substrate AR, and is located below the black matrix BM. The main common electrode CAL is located above the source line S1, and the main common electrode CAR is located above the source line S2. In the aperture portion AP, a region between the pixel electrode PE and the common electrode CE corresponds to a transmissive region through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and the overcoat layer OC. The second alignment film AL2 is formed of a material which exhibits horizontal alignment properties.

The first alignment film AL1 and second alignment film AL2 are subjected to alignment treatment for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example indicated in part (A) of FIG. 2, both the first alignment treatment direction PD1 and the second alignment treatment direction PD2 are parallel to the second direction Y and are identical to each other. In an example indicated in part (B) of FIG. 2, both the first alignment treatment direction PD1 and the second alignment treatment direction PD2 are parallel to the second direction Y and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant on the outside of the active area ACT in the state in which the predetermined cell gap is created therebetween. The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of, for example, a liquid crystal material having a positive (positive-type) dielectric constant anisotropy.

A first optical element OD1 is attached to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed, for example, such that the polarization axis thereof is parallel or perpendicular to the direction of extension of the main pixel electrode PA or the initial alignment direction of liquid crystal molecules LM. In an example shown in part (a) of FIG. 2, the first polarizer PL1 is disposed such that the first polarization axis AX1 thereof is perpendicular to the second direction Y, and the second polarizer PL2 is disposed such that the second polarization axis AX2 thereof is parallel to the second direction Y. In an example shown in part (b) of FIG. 2, the second polarizer PL2 is disposed such that the second polarization axis AX2 thereof is perpendicular to the second direction Y, and the first polarizer PL1 is disposed such that the first polarization axis AX1 thereof is parallel to the second direction Y.

Next, the operation of the liquid crystal display panel LPN having the above-described structure is described.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

In the meantime, the initial alignment direction of the liquid crystal molecule LM corresponds to a direction in which the major axis of the liquid crystal molecule LM at the OFF time is orthogonally projected onto the X-Y plane. In this example, the first alignment treatment direction PD1 and the second alignment treatment direction PD2 are substantially parallel to the second direction Y and are identical. The liquid crystal molecule LM at the OFF time is initially aligned such that the major axis thereof is substantially parallel to the second direction Y, as indicated by a broken line in FIG. 2. In short, the initial alignment direction of the liquid crystal molecule LM is parallel to the second direction Y.

In the cross section of the liquid crystal layer LQ, the liquid crystal molecules LM are substantially horizontally aligned (the pre-tilt angle is substantially zero) in the middle part of the liquid crystal layer LQ, and the liquid crystal molecules LM are aligned with such pre-tilt angles that the liquid crystal molecules LM become symmetric in the vicinity of the first alignment film AL1 and in the vicinity of second alignment film AL2, with respect to the middle part as the boundary (splay alignment). In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

At this OFF time, part of light from the backlight 4 passes through the first polarizer PL1, and enters the liquid crystal display panel LPN. The light, which has entered the liquid crystal display panel LPN, is linearly polarized light which is perpendicular to the first polarization axis AX1 of the first polarizer PL1. The polarization state of linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and the common electrode CE, a lateral electric field (or an oblique electric field), which is substantially parallel to the substrates, is produced between the pixel electrode PE and the common electrode CE. The liquid crystal molecules LM are affected by the electric field between the pixel electrode PE and common electrode CE, and the polarization state thereof varies. In the example shown in FIG. 2, in the region between the pixel electrode PE and main common electrode CAL, the liquid crystal molecule LM in a lower-half region rotates clockwise relative to the second direction Y, and is aligned in a lower left direction in the Figure, and the liquid crystal molecule LM in an upper-half region rotates counterclockwise relative to the second direction Y, and is aligned in an upper left direction in the Figure. In the region between the pixel electrode PE and main common electrode CAR, the liquid crystal molecule LM in a lower-half region rotates counterclockwise relative to the second direction Y, and is aligned in a lower right direction in the Figure, and the liquid crystal molecule LM in an upper-half region rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrodes PE, and domains are formed in the respective alignment directions. Specifically, a plurality of domains are formed in one pixel PX.

At this ON time, the polarization state of linearly polarized light, which has entered the liquid crystal display panel LPN, varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

According to the present embodiment, in the pixel PX, the drain electrode WD, which has the same potential as the pixel electrode PE, is interposed between the storage capacitance line C and the pixel electrode PE (in particular, the sub-pixel electrode PB). In addition, the drain electrode WD is disposed in a manner to overlap the storage capacitance line C. Thus, at the ON time, it is possible to suppress formation of an undesired electric field between the storage capacitance line C and sub-pixel electrode PB. In short, the drain electrode WD functions as a shield electrode which shields an electric field from the storage capacitance line C. Accordingly, it is possible to suppress a disturbance of alignment of liquid crystal molecules LM due to an undesired electric field in that region of the transmissive region, which is close to the storage capacitance line C, and to suppress a decrease in transmittance. Thereby, degradation in display quality can be suppressed.

In a comparative example, when the drain electrode having a shield function is not disposed, there may be a case in which an electric field is produced between the storage capacitance line C and the sub-pixel electrode PB at the ON time. In particular, an electric field along the second direction Y tends to be produced in a region near the edge along the first direction X of the storage capacitance line C. Since the direction of such an electric field differs from the direction of a normal electric field for rotating liquid crystal molecules in the transmissive region, such an electric field becomes a factor which causes a disturbance of alignment of liquid crystal molecules. Consequently, even at the ON time, a dark line occurs in the transmissive region near the edge of the storage capacitance line C, and the transmittance per pixel decreases.

On the other hand, in the present embodiment, since the drain electrode WD having the shield function is disposed, it is possible to suppress occurrence of a dark line in the transmissive region near the edge of the storage capacitance line C, and to enhance the transmittance per pixel, compared to the comparative example. The inventor confirmed that when the transmittance per pixel in the comparative example was 1, a transmittance of 1.1 per pixel was successfully obtained in the present embodiment.

The above-described example is directed to the case where the initial alignment direction of liquid crystal molecules LM is parallel to the second direction Y. However, the initial alignment direction of liquid crystal molecules LM may be an oblique direction which obliquely crosses the second direction Y.

Besides, the above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy.

Next, other structure examples of the embodiment are described.

Figure 4:
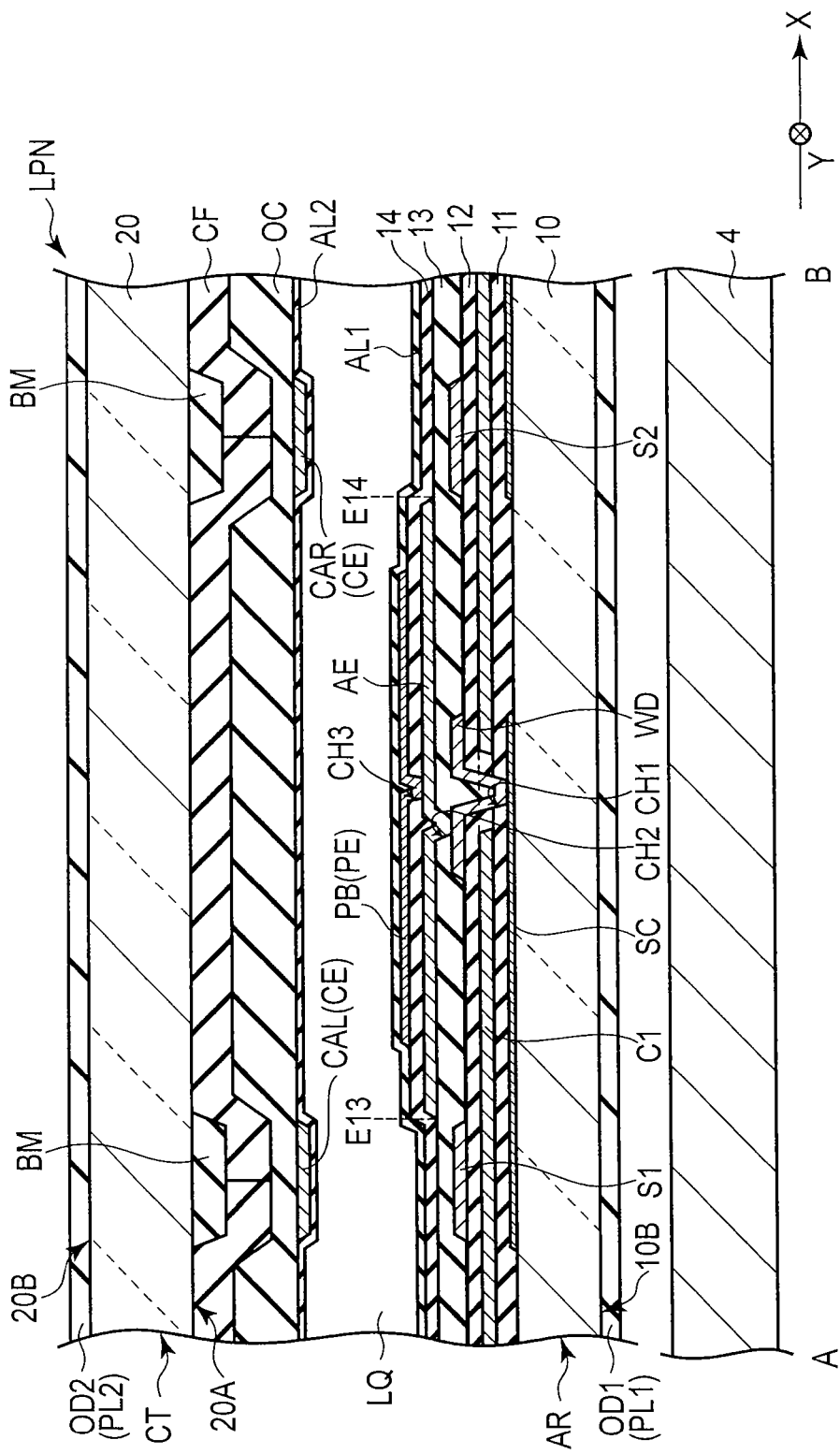
FIG. 4 is a schematic cross-sectional view, taken along line A-B in FIG. 2, showing another cross-sectional structure of the liquid crystal display panel shown in FIG. 2.

FIG. 4 is a schematic cross-sectional view, taken along line A-B in FIG. 2, showing another cross-sectional structure of the liquid crystal display panel LPN shown in FIG. 2. FIG. 4 shows only parts which are necessary for the description. The same structural parts as in the example shown in FIG. 3 are denoted by like reference numerals, and a detailed description thereof is omitted.

The structure example shown in FIG. 4 differs from that shown in FIG. 3 in that the array substrate AR further includes an auxiliary electrode AE and a fourth insulation film (third interlayer insulation film) 14.

Specifically, the drain electrode WD, which is put in contact with the semiconductor layer SC in the contact hole CH1, and the source line S1 and source line S1, are all formed on the second insulation film 12 and are covered with the third insulation film 13. The auxiliary electrode AE is formed on the third insulation film 13 and is covered with the fourth insulation film 14. The auxiliary electrode AE extends in a contact hole CH2 which penetrates the third insulation film 13, and is put in contact with the drain electrode WD which is exposed from the contact hole CH2. The auxiliary electrode AE is an electrically conductive layer which is formed in a layer different from the layer of the source line S1, etc., and is spaced apart from the source line S. Like the drain electrode WD shown in FIG. 2, the auxiliary electrode AE is opposed to the storage capacitance line C1 between the source line S1 and source line S2. Like the drain electrode WD shown in FIG. 2, a pair of edges along the first direction of the auxiliary electrode AE substantially overlap the pair of edges E11 and E12 along the first direction X of the storage capacitance line C1. An edge E13 of the auxiliary electrode AE is located above the source line S1. An edge E14 of the auxiliary electrode AE is located above the source line S2. Thus, the auxiliary electrode AE is disposed in a manner to overlap the storage capacitance line C1, without creating a gap between the edge 513 and source line S1 or a gap between the edge E14 and source line S2 in the X-Y plane. The auxiliary electrode AE may be formed of a transparent, electrically conductive material, like the pixel electrode, etc., or may be formed of an opaque wiring material, like the source line, etc.

The pixel electrode PE is formed on the fourth insulation film 14. The sub-pixel electrode PB extends in a contact hole CH3 which penetrates the fourth insulation film 14, and is put in contact with the auxiliary electrode AE which is exposed from the contact hole CH3. The fourth insulation film 14 is formed of, for example, a transparent inorganic material or a transparent resin material.

Although the drain electrode WD may be formed in the same manner as in the structure example shown in FIG. 3, the shape of the drain electrode WD is not particularly limited. In addition, the auxiliary electrode AE may be directly put in contact with the semiconductor layer SC via a contact hole penetrating the first insulation film 11, second insulation film 12 and third insulation film 13. In this case, the drain electrode WD, which lies between the second insulation film 12 and third insulation film 13, may be omitted.

According to this structure example, in the pixel PX, the auxiliary electrode AE, which has the same potential as the pixel electrode PE, is interposed between the storage capacitance line C and the pixel electrode PE (in particular, the sub-pixel electrode PB). In addition, the auxiliary electrode AE is disposed in a manner to overlap the storage capacitance line C. Thus, at the ON time, in particular, it is possible to suppress formation of an undesired electric field between the storage capacitance line C and sub-pixel electrode PB. In short, the auxiliary electrode AE functions as a shield electrode which shields an electric field from the storage capacitance line C. In addition, since the auxiliary electrode AE is located in a layer different from the layer of the source line S, the auxiliary electrode AE can cover substantially the entirety of the storage capacitance line extending between the neighboring source lines, and the electric field shield function can be more improved than in the structure example shown in FIG. 3. Accordingly, it is possible to suppress a disturbance of alignment of liquid crystal molecules LM due to an undesired electric field in that region of the transmissive region, which is close to the storage capacitance line C, and to further suppress a decrease in transmittance. Thereby, degradation in display quality can be suppressed.

In the meantime, a greater number of electrically conductive layers may be interposed between the storage capacitance line C and the pixel electrode PE. It should suffice if at least one of these electrically conductive layers has the same potential as the pixel electrode PE and is formed in a manner to overlap the storage capacitance line C that is located between the neighboring source lines.

Next, variations of the present embodiment are described.

Figure 5:
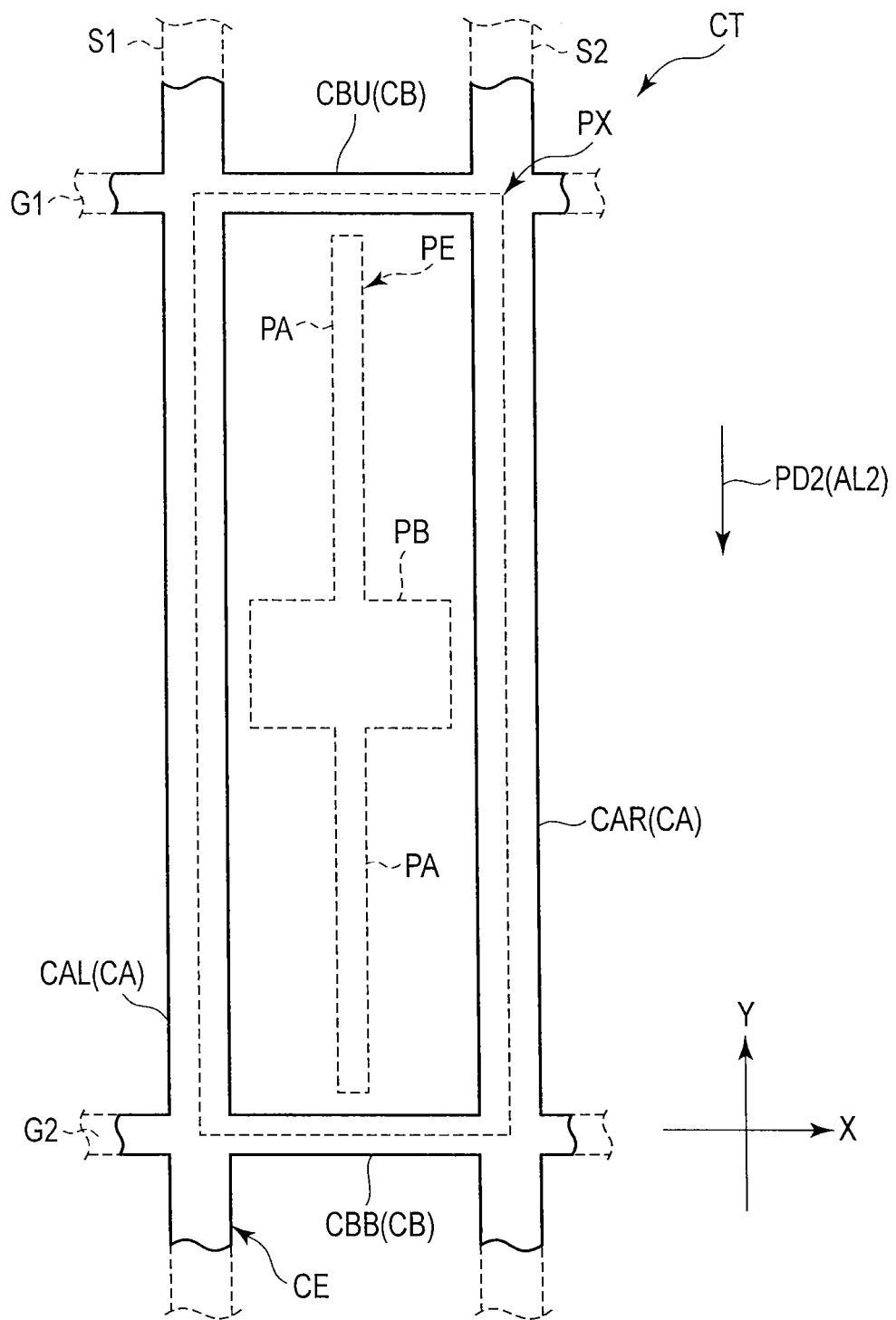
FIG. 5 is a plan view which schematically shows another structure example of the counter-substrate, which is applicable to the embodiment.

For example, as shown in FIG. 5, the counter-substrate CT may further include a sub-common electrode CB which constitutes the common electrode CE. Specifically, the common electrode CE includes the sub-common electrode CB which is formed integral or continuous with the main common electrode CA. The sub-common electrode CB is located above the gate line G and is formed in a strip shape extending in the first direction X. In the example illustrated, the common electrode CE includes a sub-common electrode CBU disposed at the upper side end portion of the pixel PX, and a sub-common electrode CBB disposed at the lower side end portion of the pixel PX. The sub-common electrode CBU is located above the gate line G1, and the sub-common electrode CBB is located above the gate line G2. The common electrode CE including the main common electrode CA and sub-common electrode CB is covered with the second alignment film AL2. In the counter-substrate CT, the common electrode CE including the main common electrode CA and sub-common electrode CB is formed in a grid shape. When the counter-substrate CT including the illustrated common electrode CE is applied, the pixel electrode PE is located in the inside surrounded by the grid-shaped common electrode CE in the X-Y plane.

With this structure example, the same advantageous effects as in the above-described examples can be obtained. In addition, even if breakage occurs in a part of the common electrode CE provided on the counter-substrate CT, the common potential can stably be supplied to each pixel PX, and the occurrence of a display defect can be suppressed.

Besides, as shown in FIG. 6, the array substrate AR may further include a first shield electrode (gate shield electrode) SE1 and a second shield electrode (source shield electrode) SE2. The first shield electrode SE1 has the same potential as the common electrode CE, extends in the first direction X, and is formed to be opposed to each of the gate lines G. The first shield electrode SE1 is covered with the first alignment film AL1. The second shield electrode SE2 has the same potential as the common electrode CE, extends in the second direction Y, and is formed to be opposed to each of the source lines S. The second shield electrode SE2 is covered with the first alignment film AL1.

When the first shield electrode SE1 and second shield electrode SE2 are combined as in the illustrated example, the first shield electrode SE1 and second shield electrode SE2 are formed integral or continuous with each other, and both form a grid shape. In this case, the pixel electrode PE is located in the inside surrounded by the first shield electrode SE1 and second shield electrode SE2. The pixel electrode PE, however, is spaced apart from, and electrically insulated from, the first shield electrode SE1 and second shield electrode SE2. Incidentally, the structure of the pixel electrode PE is not limited to the illustrated example, and the pixel electrode PE may include a plurality of main pixel electrodes PA.

With this structure example, the same advantageous effects as in the above-described examples can be obtained. In addition, with the provision of the first shield electrode SE1, an undesired electric field from the gate line G can be shielded. Thus, it is possible to suppress application of an undesired bias to the liquid crystal layer LQ from the gate line G, and to further suppress degradation in display quality. In addition, with the provision of the second shield electrode SE2, an undesired electric field from the source line S can be shielded. Thus, it is possible to suppress application of an undesired bias to the liquid crystal layer LQ from the source line S, and to further suppress degradation in display quality. Moreover, even if breakage occurs in a part of the first shield electrode SE1 and second shield electrode SE2 provided on the array substrate AR, the common potential can stably be supplied to each pixel PX, and the occurrence of a display defect can be suppressed.

As has been described above, according to the present embodiment, a liquid crystal display device, which can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a gate line extending in a first direction, a storage capacitance line spaced apart from the gate line, a first interlayer insulation film covering the gate line and the storage capacitance line, a source line located on the first interlayer insulation film and extending in a second direction crossing the first direction, a switching element which is electrically connected to the gate line and the source line and includes a drain electrode located on the first interlayer insulation film, spaced apart from the source line and opposed to the storage capacitance line, a second interlayer insulation film covering the source line and the drain electrode, a pixel electrode which is located on the second interlayer insulation film and includes a main pixel electrode extending in the second direction and a sub-pixel electrode which extends in the first direction at a position inside a position above an edge of the drain electrode and is put in contact with the drain electrode, and a first alignment film covering the pixel electrode;
a second substrate including a common electrode, which includes a main common electrode extending in the second direction on both sides of the main pixel electrode, and a second alignment film covering the common electrode; and
a liquid crystal layer held between the first substrate and the second substrate,
wherein the switching element includes a semiconductor layer extending under the storage capacitance line,
the storage capacitance line comprises an aperture portion,
the drain electrode is electrically connected to the semiconductor layer via the aperture portion, and
the sub-pixel electrode is electrically connected to the drain electrode in a region opposed to the storage capacitance line.

2. The liquid crystal display device of claim 1, wherein a width in the second direction of the drain electrode is equal to or greater than a width in the second direction of the storage capacitance line.

3. The liquid crystal display device of claim 2, wherein the drain electrode includes a first edge and a second edge which overlap a pair of edges along the first direction of the storage capacitance line.

4. The liquid crystal display device of claim 2, wherein the drain electrode includes a first edge and a second edge which are located outside a pair of edges along the first direction of the storage capacitance line.

5. The liquid crystal display device of claim 1, wherein the drain electrode is formed of a same material as the source line.

6. The liquid crystal display device of claim 1, wherein the sub-pixel electrode crosses the main pixel electrode at an intermediate portion in the second direction of the main pixel electrode.

7. The liquid crystal display device of claim 1, wherein the main common electrode is located above the source line.

8. The liquid crystal display device of claim 1, wherein the common electrode further includes a sub-common electrode which is connected to the main common electrode, is located above the gate line, and has a strip shape extending in the first direction.

9. The liquid crystal display device of claim 1, wherein the drain electrode includes a first edge and a second edge extending in the first direction and a third edge and a fourth edge extending in the second direction, and
the entire sub-pixel electrode is located inside positions above the first edge, the second edge, the third edge, and the fourth edge.

10. A liquid crystal display device comprising:
a first substrate including a storage capacitance line extending in a first direction, a first interlayer insulation film covering the storage capacitance line, a switching element including a drain electrode located on the first interlayer insulation film and opposed to the storage capacitance line, a second interlayer insulation film covering the drain electrode, a pixel electrode which is located on the second interlayer insulation film and includes a main pixel electrode extending in a second direction and a sub-pixel electrode which extends in the first direction at a position inside a position above an edge of the drain electrode and is put in contact with the drain electrode, and a first alignment film covering the pixel electrode;
a second substrate including a common electrode, which includes a main common electrode extending in the second direction, and a second alignment film covering the common electrode; and
a liquid crystal layer held between the first substrate and the second substrate,
wherein the switching element includes a semiconductor layer extending under the storage capacitance line,
the storage capacitance line comprises an aperture portion,
the drain electrode is electrically connected to the semiconductor layer via the aperture portion, and
the sub-pixel electrode is electrically connected to the drain electrode in a region opposed to the storage capacitance line.

11. The liquid crystal display device of claim 10, wherein a width in the second direction of the drain electrode is equal to or greater than a width in the second direction of the storage capacitance line.

12. The liquid crystal display device of claim 11, wherein the drain electrode includes a first edge and a second edge which overlap a pair of edges along the first direction of the storage capacitance line.

13. The liquid crystal display device of claim 11, wherein the drain electrode includes a first edge and a second edge which are located outside a pair of edges along the first direction of the storage capacitance line.

14. The liquid crystal display device of claim 10, wherein the drain electrode includes a first edge and a second edge extending in the first direction and a third edge and a fourth edge extending in the second direction, and
the entire sub-pixel electrode is located inside positions above the first edge, the second edge, the third edge, and the fourth edge.

* * * * *